United States Patent
Arai et al.

(10) Patent No.: US 6,500,047 B2
(45) Date of Patent: Dec. 31, 2002

(54) SEMICONDUCTOR WAFER CUTTING MACHINE

(75) Inventors: Kazuhisa Arai, Tokyo (JP); Masaya Takeuchi, Tokyo (JP); Hideyuki Sando, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/825,892

(22) Filed: Apr. 5, 2001

(65) Prior Publication Data

US 2001/0029938 A1 Oct. 18, 2001

(30) Foreign Application Priority Data

Apr. 14, 2000 (JP) .......................... 2000-113674

(51) Int. Cl.$^7$ .............................. B24B 49/00
(52) U.S. Cl. .................. 451/14; 451/11; 125/13.01
(58) Field of Search ................. 125/13.01; 451/41, 451/8, 10, 14, 9

(56) References Cited

U.S. PATENT DOCUMENTS

| | | | | |
|---|---|---|---|---|
| 5,628,673 A | * | 5/1997 | Morooka | 451/9 |
| 5,718,615 A | * | 2/1998 | Boucher et al. | 451/5 |
| 6,102,023 A | * | 8/2000 | Ishiwata et al. | 125/13.01 |
| 6,152,803 A | * | 11/2000 | Boucher et al. | 451/12 |
| 6,254,454 B1 | * | 7/2001 | Easter et al. | 451/8 |

\* cited by examiner

*Primary Examiner*—Robert A. Rose
(74) *Attorney, Agent, or Firm*—Smith, Gambrell & Russell, LLP

(57) ABSTRACT

A cutting machine comprises a chucking means for holding the semiconductor wafer that is to be cut, a cutting means for cutting the semiconductor wafer held on the chucking means, a first moving means for moving the chucking means relative to the cutting means in a moving direction perpendicular to the center axis of the chucking means, and a second moving means for moving the cutting means relative to the chucking means in a direction of depth of cutting which is the direction of center axis of the chucking means. The cutting machine further comprises a thickness detecting means for detecting the thickness of the workpiece held on the chucking means, and a control means for controlling the motion of the second moving means depending upon the thickness of the workpiece detected by the thickness detecting means and for setting the position of the cutting means in the direction of depth of cutting relative to the chucking means thereby to set the depth of cutting the workpiece by the cutting means. The thickness detecting means includes a non-contact back-pressure sensor having a nozzle for flowing out a gas toward the surface of the workpiece held on the chucking means.

4 Claims, 5 Drawing Sheets

SEMICONDUCTOR WAFER CUTTING MACHINE

FIELD OF THE INVENTION

The present invention relates to a cutting machine for cutting a workpiece and, particularly, for cutting a semiconductor wafer with a required depth of cutting.

DESCRIPTION OF THE PRIOR ART

In the production of semiconductor chips as is well known among people skilled in the art, a number of rectangular regions are sectioned on the surface of a semiconductor wafer by streets that are arranged in a lattice form, and a semiconductor circuit is arranged in each of the rectangular regions. The semiconductor wafer is separated along the streets into individual rectangular regions to obtain semiconductor chips. A cutting machine used for separating the semiconductor wafer along the streets includes a chucking means for holding the semiconductor wafer that is to be cut, a cutting means for cutting the semiconductor wafer held on the chucking means, a first moving means for moving the chucking means relative to the cutting means in a moving direction perpendicular to the center axis of the chucking means, and a second moving means for moving the cutting means relative to the chucking means in a direction of depth of cutting, which is the direction of center axis of the chucking means. In this cutting machine, a position of the cutting means in the direction of depth of cutting relative to the chucking means is set by the second moving means, and the chucking means is moved relative to the cutting means by the first moving means to cut the semiconductor wafer. The depth of cutting the semiconductor wafer is defined by the position of the cutting means in the direction of cutting relative to the chucking means and by the thickness of the semiconductor wafer held on the chuck.

Generally, the thickness of the semiconductor wafer is nearly the same in each lot and hence, only one piece of semiconductor wafer in each lot is measured for its thickness manually to recognize the thickness of the semiconductor wafer to be cut. In the cutting of the semiconductor wafer by the cutting machine, the depth of cutting the semiconductor wafer is set by setting the position of the cutting means in the direction of cutting relative to the chucking means at a predetermined position, without detecting the thickness of the individual semiconductor wafers that are to be cut. However, the individual semiconductor wafers in each lots fluctuate a bit in thickness and hence, the depth of cutting the semiconductor wafers varies also in the individual semiconductor wafers, even though it is a slim amount.

Meanwhile, it is important to set the depth of cutting the semiconductor wafer very precisely and it is desired to avoid a change in the depth of cutting the semiconductor wafers that is ascribed to a change in the thickness of the individual semiconductor wafers. For example, it has been done to form a groove of a V-shape in cross section along the streets in the surface of the semiconductor to chamfer the four side edges of the surfaces of the individual rectangular regions prior to completely cutting the semiconductor wafer along the streets to separate it into the individual rectangular regions. Even in forming the V-shaped grooves, however, it is important to sufficiently precisely set the depth of cutting to sufficiently precisely set the size of chamfering. In recent years, further, a mode of separation into rectangular regions or a so-called prediing, has been put into practice. In this mode, too, it is important very precisely set the depth of cutting the semiconductor wafer. In the mode of separation into rectangular regions called dicing-before-grinding, the semiconductor wafer is cut to form grooves of a predetermined depth from the surface along the streets arranged in a lattice form. Then, the back surface of the semiconductor wafer is ground to decrease the thickness of the semiconductor wafer up to a thickness equal to the depth of the grooves thereby to separate the semiconductor wafer into the individual rectangular regions.

Japanese Laid-open Patent Publication (Kokai) No. 261907/1987 (JP-A 62-261907) discloses an art in which a gap between a microscope system and the surface of chucking means and a gap between the microscope system and the surface of a semiconductor wafer held on the chucking means are measured by an automatic focusing technology using the microscope system disposed above the chucking means that is located at a predetermined position, and the thickness of the semiconductor wafer is calculated from the measured values. According to this prior art, further, the position of the cutting means in the direction of cutting is set relative to the chucking means based on the calculated thickness of the semiconductor wafer, thereby to set the depth of cutting the semiconductor wafer. When a transparent or semitransparent film such as glassy film is formed on the surface of the semiconductor wafer, however, it is not possible to detect the thickness of the semiconductor wafer precisely by the above automatic focusing technology, which is a serious problem.

SUMMARY OF THE INVENTION

It is therefore a principal object of the present invention to provide a-cutting machine particularly suited for cutting a semiconductor wafer, which is capable of detecting the thickness of a workpiece held on the chucking means with a sufficient degree of precision even when a transparent or semitransparent film exists on the surface of the workpiece, and which can set the depth of cutting the workpiece with a sufficient degree of precision based on the detected thickness of the workpiece, without the need of bringing a probe into contact with the surface of the workpiece such as the semiconductor wafer and hence, without possibility of damaging the surface of the workpiece.

In order to accomplish the above-mentioned principal object according to the present invention, there is provided a cutting machine comprising a chucking means for holding a semiconductor wafer that is to be cut; a cutting means for cutting the semiconductor wafer held on the chucking means; a first moving means for moving the chucking means relative to the cutting means in a moving direction perpendicular to the center axis of the chucking means; a second moving means for moving the cutting means relative to the chucking means in a direction of depth of cutting, which is the direction of center axis of the chucking means; a thickness detecting means for detecting the thickness of the workpiece held on the chucking means; and a control means for controlling the motion of the second moving means depending upon the thickness of the workpiece detected by the thickness detecting means and for setting the position of the cutting means in the direction of depth of cutting relative to the chucking means thereby to set the depth of cutting the workpiece by the cutting means;

wherein the thickness detecting means includes a non-contact back-pressure sensor having a nozzle for flowing out a gas toward the surface of the workpiece held on the chucking means.

Preferably, the nozzle of the non-contact back-pressure sensor is mounted to freely move in the direction of depth of cutting. In a preferred embodiment, the chucking means has an adsorbing surface for vacuum-adsorbing the workpiece; and the thickness detecting means includes a nozzle position detecting means for detecting a gap from an original position of the nozzle where an end of the nozzle comes in contact with the adsorbing surface of the chucking means to the present position of the nozzle, and a thickness calculation means for calculating the thickness of the workpiece from the gap between the end of the nozzle and the surface of the workpiece on the chucking means detected by the non-contact back-pressure sensor and from the gap between the original position of the nozzle and the present position of the nozzle detected by the nozzle position detecting means. Further, the workpiece is a semiconductor wafer.

DETAILED DESCRIPTION OF THE PREFERRED EMBODIMENTS

Figure 1:
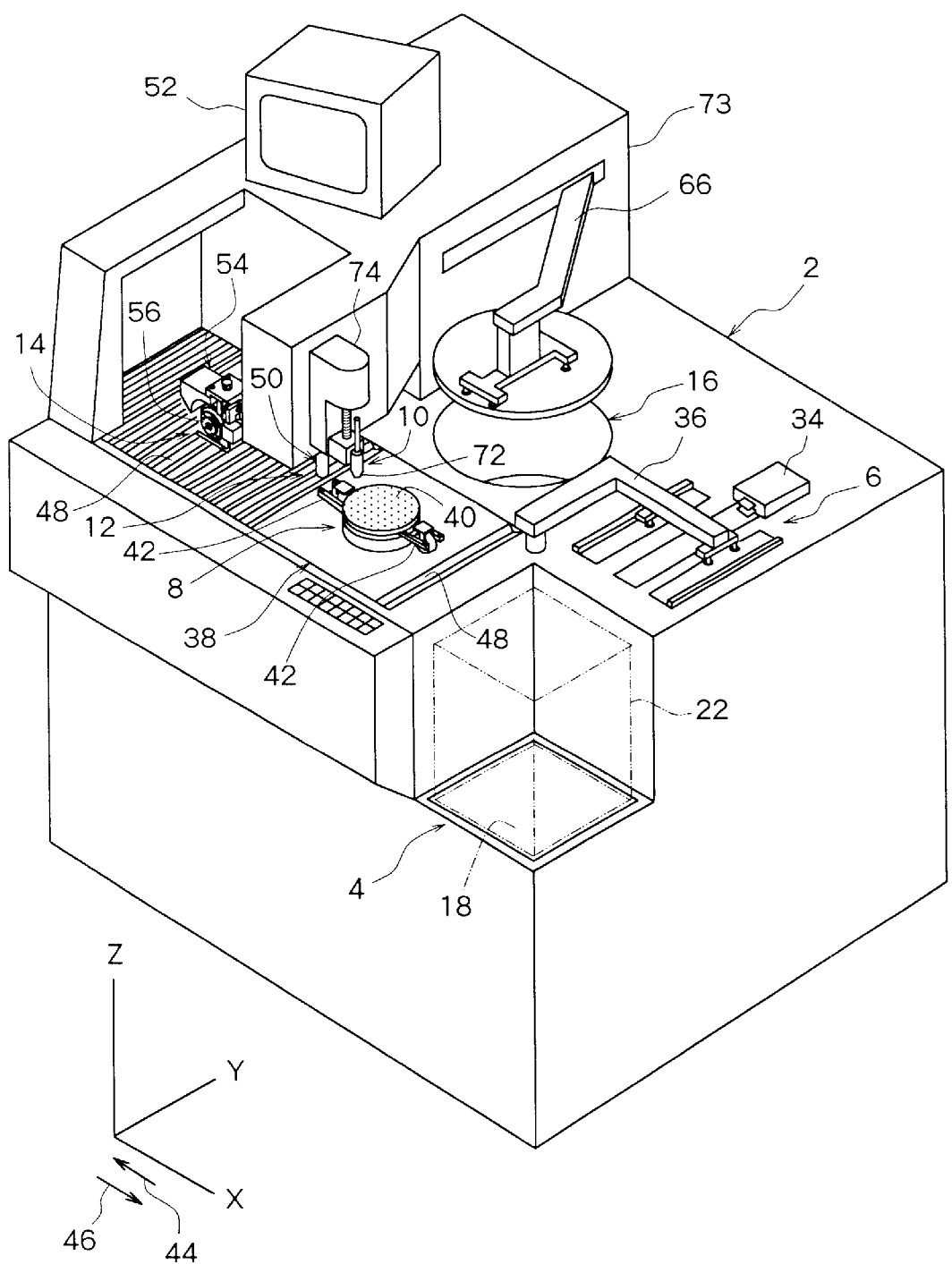
FIG. 1 is a schematic perspective view illustrating a preferred embodiment of a cutting machine constituted according to the present invention.

FIG. 1 is a view illustrating a preferred embodiment of a cutting machine constituted according to the present invention. The illustrated cutting machine has a housing 2 on which are specified a loading area 4, a waiting area 6, a chucking area 8, a thickness-detecting area 10, an alignment area 12, a cutting area 14 and a washing/drying area 16. A lift table 18 is disposed in the loading area 4. On the lift table 18 is loaded a cassette 22 which accommodates plural pieces of semiconductor wafers 20 (FIG. 2) maintaining clearance in the up-and-down direction.

Figure 2:
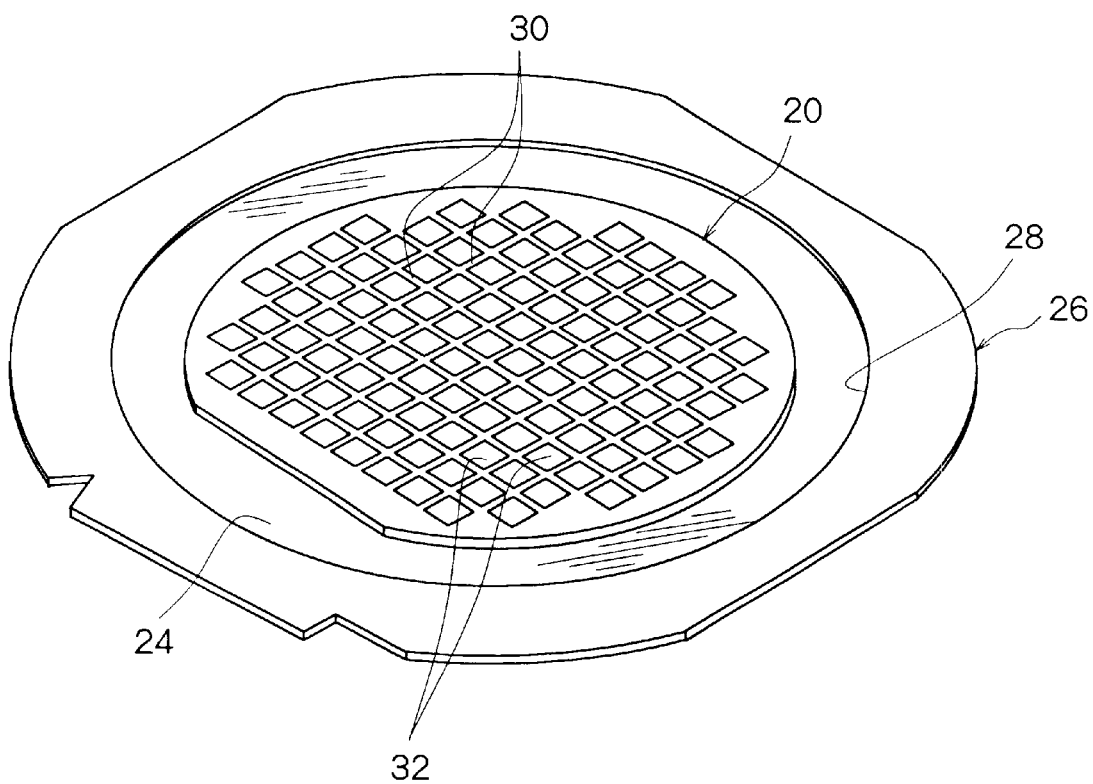
FIG. 2 is a perspective view illustrating a semiconductor wafer supplied as a workpiece to the cutting machine of FIG. 1, which is mounted on a frame via a mounting tape.

As clearly shown in FIG. 2, the semiconductor wafer 20 accommodated in the cassette 22 is mounted on a frame 26 via a mounting tape 24. The frame 26 that can be formed of a thin metal plate or a synthetic resin has a relatively large circular opening 28 at the central portion thereof, and the mounting tape 24 stuck to the back surface of the frame 26 extends across the circular opening 28. The semiconductor wafer 20 is positioned in the circular opening 28 and its back surface is stuck to the mounting tape 24. Streets 30 are arranged in a lattice form on the surface of the semiconductor wafer 20, and a number of rectangular regions 32 are sectioned by the streets 30. A semiconductor circuit is arranged on each of the rectangular regions 32.

If further described with reference to FIG. 1, a first conveying means 34 is arranged in relation to the loading area 4 and the waiting area 6. The first conveying means 34 is actuated in response to the up-and-down movement of the lift table 18 to successively deliver out the frames 26 mounting the semiconductor wafer 20 to be cut from the cassette 22 into the waiting area 6 (and as will be described later, to carry the frames 26 mounting the semiconductor wafer 20 that has been cut, washed and dried into the cassette 22 from the waiting area 6). A second conveying means 36 is arranged in relation to the waiting area 6, chucking area 8 and washing/drying area 16. The frame 26 delivered from the cassette 22 onto the waiting area 6, is conveyed by the second conveying means 36 to the chucking area 8. In the chucking area 8, the frame 26 and the semiconductor wafer 20 mounted thereon are held by a chucking means 38. If described in further detail, the chucking means 38 includes a chucking plate 40 with a substantially horizontal adsorbing surface. Plural suction holes or grooves are formed in the chucking plate 40. The semiconductor wafer 20 mounted on the frame 26 is placed on the chucking plate 40 and is vacuum-adsorbed by the chucking plate 40. The chucking means 38 further includes a pair of grip means 42, and the frame 26 is gripped by the pair of grip means 42.

As will be described later, the chucking means 38 is allowed to freely move in a substantially horizontal direction of X-axis (moving direction perpendicular to the center axis extending substantially vertically of the chucking means 38). The semiconductor wafer 20 held by the chucking means 38, is moved with the movement of the chucking means 38 and is conveyed to the thickness-detecting area 10, alignment area 12 and cutting area 14 successively. In the illustrated embodiment, a bellows means 48 are disposed on both sides (downstream side and upstream side) of the chucking means 38 as viewed in the direction of X-axis so as to be expanded and contracted with the movement of the chucking means 38. The thickness-detecting area 10 detects the thickness of the workpiece (or more closely, the total thickness of the thickness of the semiconductor wafer 20 and the thickness of the mounting tape 24 stuck to the back surface thereof in the illustrated embodiment) held on the chucking plate 40 as will be described later in further detail. An imaging means 50 is disposed on the alignment area 12, the surface of the semiconductor wafer 20 is imaged by the imaging means 50, and the positions of the streets 30 arranged on the surface of the semiconductor wafer 20 are precisely recognized upon analyzing the imaged image. The image of the surface of the semiconductor wafer 20 imaged by the imaging means 50 can be displayed on a monitor 52.

A cutting means 54 having a rotary cutting blade 56 is disposed on the cutting area 14 to cut the semiconductor wafer 20. The chucking plate 40 is so mounted on the chucking means 38 as to freely rotate on the center axis that extends substantially vertically. By appropriately rotating the chucking plate 40, the streets 30 extending in a predetermined direction are positioned in parallel with the moving direction of the chucking means 38, i.e., in parallel with the direction of X-axis with a sufficient degree of precision. One of the streets 30 is aligned with the rotary cutting blade 56 as viewed in a substantially horizontal direction of Y-axis (indexing direction), and the rotary cutting blade 56 is positioned at a predetermined cutting depth in a direction of Z-axis (direction of depth of cutting) which is substantially vertical. Thereafter, the chucking means 38 is moved for effecting the cutting toward the downstream side in the direction of X-axis, i.e., in the direction indicated by an arrow 44, whereby the semiconductor wafer 20 is cut along one street 30. Then, the rotary cutting blade 56 is raised up to its retracted position, and the chucking means 38 is moved back toward the upstream side in the direction of X-axis, i.e., in the direction indicated by an arrow 46. Thereafter, the rotary cutting blade 56 is index-moved in the direction of Y-axis, and the rotary cutting blade 56 is lowered again to a position of the predetermined depth of cutting. The chucking means 38 is moved for effecting the cutting in the direction indicated by the arrow 44, and the semiconductor wafer 20 is cut along the next street 30. Thus, after the semiconductor 20 is cut along all streets 30 extending in the predetermined direction, the chucking plate 40 on the chucking means 38 is turned by 90 degrees. Then, the semiconductor wafer 20 is cut along the remaining streets 30 at right angles with the streets 30 that have been cut. Though the semiconductor wafer 20 is cut along the streets 30 into individual rectangular regions 32, the mounting tape 24 is not cut, and the individual rectangular regions 32 that have been cut remain mounted on the frame 26 via the mounting tape 24. The constitution of the cutting means 54 and the cutting of the semiconductor wafer 20 by the cutting means 54 will be described later in further detail.

After the semiconductor wafer 20 has been cut as desired in the cutting area 14, the chucking means 38 is returned back to the chucking area 8. A third conveying means 66 is arranged in relation to the chucking area 8 and the washing/drying area 16 to carry the frame 26 and the semiconductor wafer 20 mounted thereon onto the washing/drying area 16. In the washing/drying area 16, the semiconductor wafer 20 that has been cut is washed and dried by the washing/drying means (not shown). Thereafter, the frame 26 and the semiconductor wafer 20 (separated into individual rectangular regions 32) mounted thereon are returned by the second conveying means 36 back to the waiting area 4 and are, then, returned by the first conveying means 34 back into the cassette 22.

In the illustrated cutting machine, a novel and improved feature of the present invention resides in the constitution related to detecting the thickness of the semiconductor wafer 20 and controlling the depth of cutting based thereupon. In other respects, the constitution may be the one well known among people skilled in the art and is not, hence, described in detail in this specification.

Figure 5:
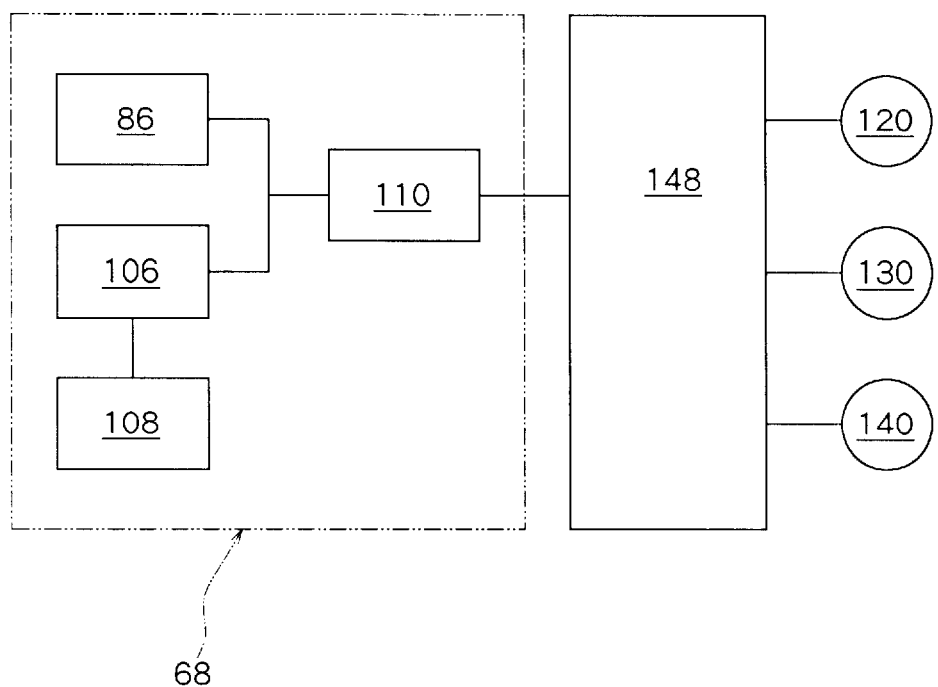
FIG. 5 is a block diagram illustrating a control means disposed in the cutting machine of FIG. 1 and related elements.

If described with reference to FIG. 1 as well as FIGS. 3 and 5, in the cutting machine constituted according to the present invention, it is important to dispose a thickness detecting means 68 for detecting the thickness of the workpiece, i.e., the total thickness T of the semiconductor wafer 20 and the mounting tape 24 stuck to the back surface thereof in the thickness-detecting area 10. It is important that the thickness detecting means 68 includes a non-contact back-pressure sensor 70. As clearly shown in FIG. 3, the non-contact back-pressure sensor 70 also called a pneumatic micrometer includes a nozzle 72 disposed in the thickness-detecting area 10.

If further described in detail, as shown in FIG. 1, the housing 2 of the cutting machine has a protruded portion 73 protruded upward on one side region thereof, and a sensor case 74 is secured to the inner upright wall surface of the protruded portion 73. The case 74 has a hollow upper portion 76 and a hanging portion 78 that hangs down from one side region of the hollow upper portion 76. A lift block 80 is so mounted to move up and down on the surface of the hanging portion 78, that extends substantially vertically. A guide groove (not shown) extending substantially vertically is formed in the surface of the hanging portion 78, and a protuberance to be guided (not shown) is formed on the lift block 80. Upon engaging the protuberance to be guided with the guide groove, the lift block 80 is so mounted on the hanging portion 78 as to freely move up and down. A pulse motor 82 is disposed in the hollow upper portion 76 in the case 74, and a threaded shaft 84 hanging down substantially vertically is coupled to the output shaft of the pulse motor 82. An internally threaded hole penetrating through the lift block substantially vertically is formed in the lift block 80, and the threaded shaft 84 is screwed into the internally threaded hole. When the threaded shaft 84 is rotated forward and reverse by the pulse motor 82, therefore, the lift block 80 moves up and down. The above-mentioned nozzle 72 is secured to the lift block 80.

The nozzle 72 that extends substantially vertically has an ejection port formed at a lower end thereof. The pulse motor 82 is provided with a nozzle position-detecting means 86 (FIG. 5) for detecting the amount of forward rotation or reverse rotation, i.e., for detecting the amount the nozzle 72 secured to the lift block 80 has moved up or moved down.

Figure 3:
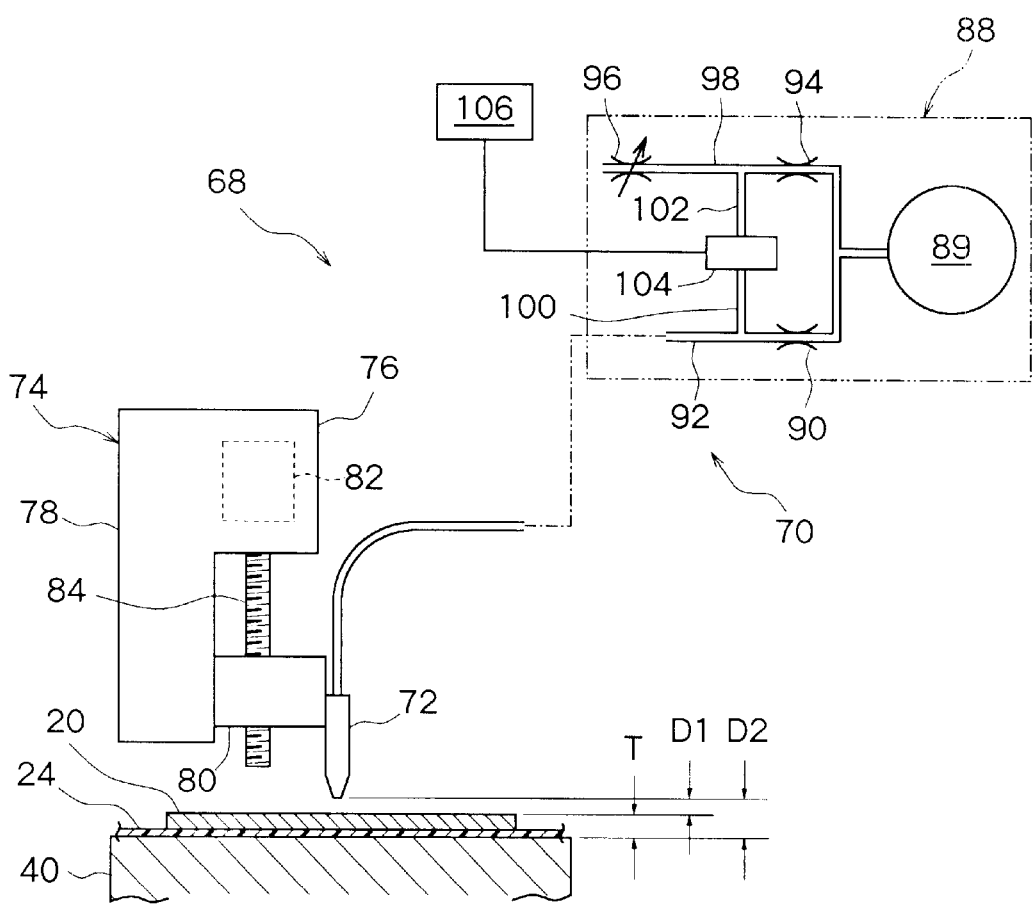
FIG. 3 is a sectional view illustrating, in a simplified manner, a portion of a thickness detecting means that detects the thickness of the workpiece held on a chucking means.

As schematically illustrated in FIG. 3, a pneumatic pressure bridge circuit 88 is connected to the nozzle 72. The pneumatic pressure bridge circuit 88 which has been known per se includes a source of compressed air 89, a flow passage 92 having a fixed squeezing means 90, and a flow passage 98 having a fixed squeezing means 94 and a variable squeezing means 96. The flow passage 92 permits the source of compressed air 89 to be communicated with the nozzle 72, and the flow passage 98 permits the source of compressed air to be communicated with the open air. The pneumatic bridge circuit 88 further includes a differential pressure gauge 104 communicated with the flow passage 92 through a flow passage 100 and communicated with the flow passage 98 through a flow passage 102, and a voltmeter 106 connected to the differential pressure gauge 104. The compressed air supplied to the nozzle 72 through the flow passage 92 is allowed to flow out toward the semiconductor wafer 20 on the chucking plate 40 from the ejection port of the nozzle 72. The flow-out resistance from the nozzle 72 varies depending upon a gap between the end of the nozzle 72 and the surface of the semiconductor wafer 20. Therefore, the pressure differential between the pressure of the flow passage 92 and the pressure of the flow passage 98 varies depending upon the gap between the end of the nozzle 72 and the surface of the semiconductor wafer 20. The differential pressure gauge 104 produces a voltage that varies depending upon the pressure differential between the pressure of the flow passage 92 and the pressure of the flow passage 98. Accordingly, the voltage indicated by the voltmeter 106 varies depending upon the gap between the end of the nozzle 72 and the surface of the semiconductor wafer 20. As for the details of the non-contact back-pressure sensor 70 equipped with the pneumatic pressure bridge circuit 88, reference should be made to, for example, Japanese Examined Utility Model Publication (Kokoku) No. 29446/1995 (JM-B 7-29446).

Figure 6:
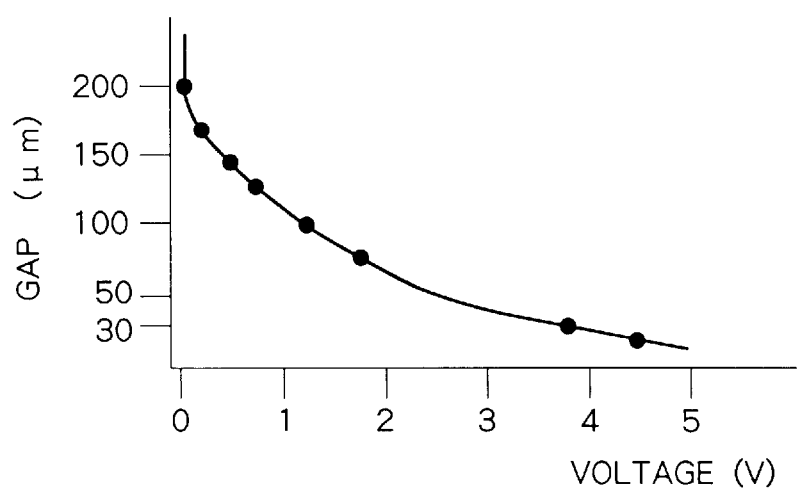
FIG. 6 is a diagram illustrating a relationship between the output voltage of a voltmeter and the gap from an end of a nozzle to a workpiece in the thickness detecting means of FIG. 3.

The non-contact back-pressure sensor 70 is provided with a reference table 108 storing data of a relationship between the voltage indicated by the voltmeter 106 and the gap of from the front end of the nozzle 72 to the surface of the semiconductor wafer 20. The data stored in the reference table 108 can be obtained, for example, in such a manner as described below. In a state where neither the frame 26 nor the semiconductor wafer 20 mounted thereon is held by the chucking means 38, the nozzle 72 is lowered and an end thereof is brought into contact with the surface of the chucking plate 40. This position of the nozzle 72 is regarded to be an original position of the nozzle. Then, the nozzle 72 is raised stepwise each time by a predetermined distance, the amounts the nozzle 72 has moved up from the original position of the nozzle are stored, and voltages of the voltmeter 106 at the respective positions of the nozzle 72 are stored, too. The amount the nozzle 72 has moved up can be precisely measured by the nozzle position-detecting means 86. FIG. 6 is a diagram illustrating data stored in the reference table 108.

To measure the thickness of the workpiece held on the chucking plate 40 of the chucking means 38, i.e., the total thickness T of the semiconductor wafer 20 and the mounting tape 24 stuck to the back surface thereof, the compressed air is flown out toward the surface of the semiconductor wafer 20 from the nozzle 72 located at a predetermined position above the semiconductor wafer 20, and a voltage indicated at this moment by the voltmeter 106 is measured. Then, by making reference to the data stored in the reference table 108, a distance D1 between the end of the nozzle 72 and the surface of the semiconductor wafer 20 is obtained from the measured voltage. Then, a calculation means 110 calculates the total thickness T (T=D2−D1) of the semiconductor wafer 20 and the mounting tape 24 stuck to the back surface thereof by subtracting the distance D1 from a distance D2 between the nozzle position indicated by the nozzle position-detecting means 86, i.e., between the original position of the nozzle and the present position of the nozzle (i.e., a gap from the surface of the chucking plate 40 to the end of the present nozzle 72). Notice should be given to the following fact in detecting the thickness of the workpiece (total thickness T of the semiconductor wafer 20 and the mounting tape 24 stuck to the back surface thereof) by the thickness-detecting means 68 that includes the non-contact back-pressure sensor 70. That is, there is no need of bringing a contact piece or the like into physical contact with the workpiece and, hence, the workpiece has no possibility of being damaged at all. Even when a transparent or semitransparent film exists on the surface of the workpiece, the thickness of the workpiece can be detected with a sufficient degree of precision without influenced by such film.

Figure 4:
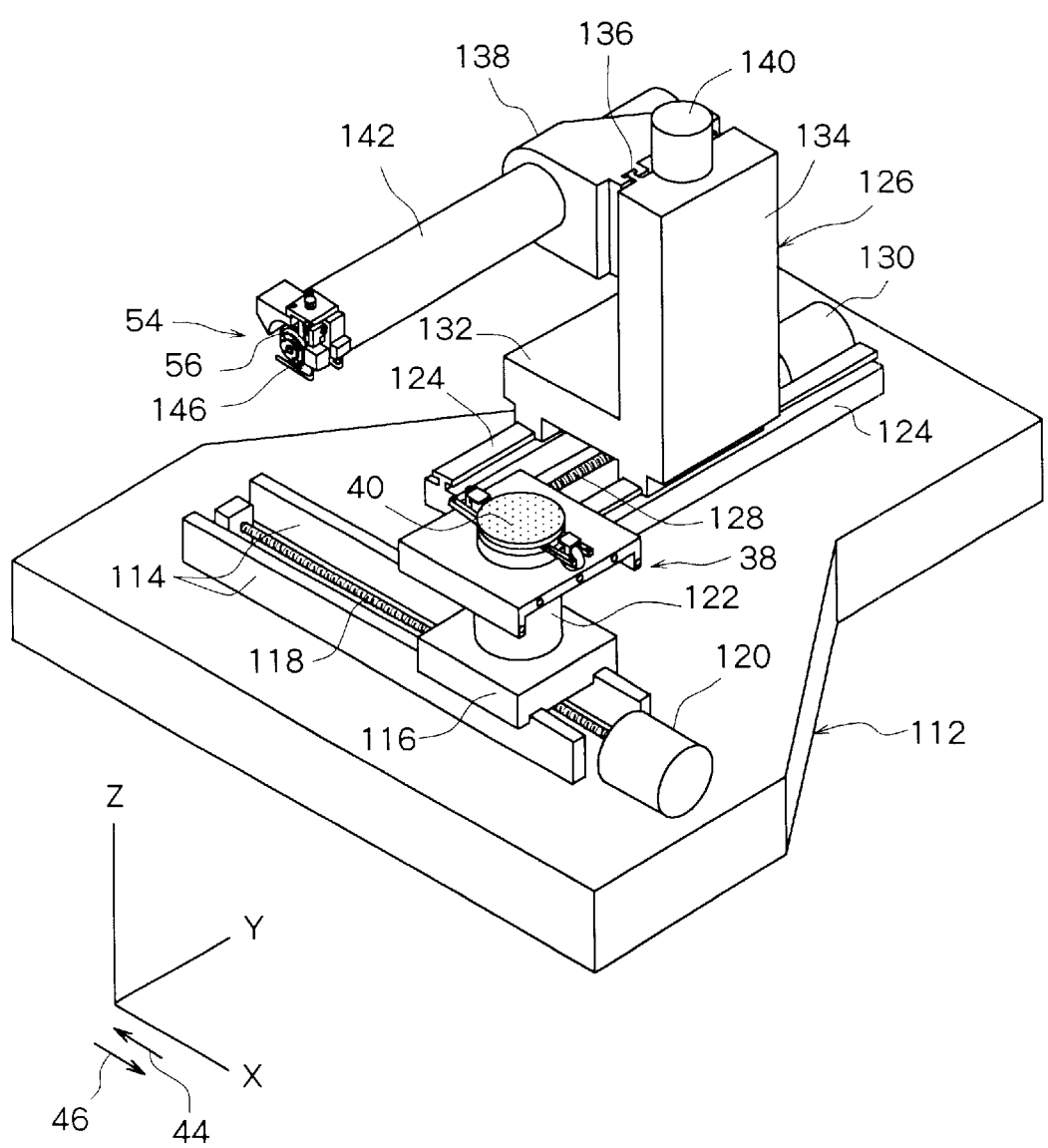
FIG. 4 is a perspective view illustrating a cutting means and the chucking means in the cutting machine of FIG. 1.

FIG. 4 illustrates elements in the major constitution in the cutting area 14 (FIG. 4 shows neither the upper wall of the housing 2 nor bellows means 48 on both sides of the chucking means 38, but shows elements arranged thereunder). A support board 112 is disposed in the housing 2. A pair of guide rails 114 are secured on the support board 112 to extend in a direction of X-axis, and a slide block 116 is so mounted on the pair of guide rails 114 as to freely move in the direction of X-axis. A threaded shaft 118 is rotatably provided between the pair of guide rails 114 and extends in the direction of X-axis. The output shaft of a pulse motor 120 is coupled to the threaded shaft 118. The slide block 116 has a hanging portion (not shown) that hangs down, an internally threaded hole penetrating through the hanging portion in the direction of X-axis is formed in the hanging portion, and the threaded shaft 118 is screwed into the internally threaded hole. The chucking means 38 is mounted on the slide block 116 through a cylindrical member 122. When the pulse motor 120 is turned forward, therefore, the chucking means 38 moves in the cutting direction indicated by an arrow 44. when the pulse motor 120 is turned reverse, the chucking means 38 moves in the return direction indicated by an arrow 46. Therefore, the pulse motor 120 constitutes a first moving means for moving the chucking means 38 in the direction of X-axis. The chucking plate 40 is so mounted on the chucking means 38 as to freely rotate on the center axis that extends substantially vertically, and a pulse motor (not shown) is disposed in the cylindrical member 122 to rotate the chucking plate 40.

A pair of guide rails 124 are also secured on the support board 112 to extend in the direction of Y-axis, and a slide block 126 is mounted on the pair of guide rails 124 to move in the direction of Y-axis. A threaded shaft 128 is rotatably provided between the pair of guide rails 124 and extends in the direction of Y-axis, and the output shaft of a pulse motor 130 is coupled to the threaded shaft 128. The slide block 126 is nearly of an L-shape, and has a horizontal base portion 132 and an upright portion 134 extending upward from the horizontal base portion 132. The horizontal portion 132 has a hanging portion (not shown) that hangs down, an internally threaded hole penetrating through the hanging portion in the direction of Y-axis is formed in the hanging portion, and the threaded shaft 128 is screwed into the internally threaded hole. A pair of guide rails 136 (FIG. 4 illustrates an upper end only of one guide rail 136) are formed on the upright portion of the slide block 126 to extend in the direction of Z-axis. A coupling block 138 is mounted on the pair of guide rails 136 to move in the direction of Z-axis. A threaded shaft (not shown) is rotatably provided in the upright portion 134 of the slide block 126 to extend in the direction of Z-axis, and the output shaft of a pulse motor 140 is coupled to the threaded shaft. The coupling block 138 has a protruded portion (not shown) that protrudes toward the upright portion 134 of the slide block 126, an internally threaded hole penetrating through the protruded portion in the direction of Z-axis is formed in the protruded portion, and the threaded shaft extending in the direction of Z-axis is screwed into the internally threaded hole. The above-mentioned cutting means 54 is mounted on the coupling block 138. The cutting means 54 has a casing 142 secured to the coupling block 138, and a rotary shaft (not shown) is rotatably mounted in the casing 142 to extend in the direction of Y-axis. The above-mentioned rotary cutting blade 56 is secured to the rotary shaft. A motor (not shown) is disposed in the casing 142 to rotate the rotary shaft at a high speed. Desirably, the rotary cutting blade 56 is of a thin disk-like shape obtained by dispersing diamond particles in an electrodeposited metal. A cooling water ejection means 146 is disposed at an end of the casing 142 to eject a cooling liquid which may be pure water.

When the pulse motor 130 is turned forward, the slide block 126 is index-moved forward in the direction of Y-axis, and along with this movement, the rotary cutting blade 56 is index-moved forward in the direction of Y-axis. When the pulse motor 130 is turned reverse, the slide block 126 is index-moved backward in the direction of Y-axis, and the rotary cutting blade 56 is index-moved backward in the direction of Y-axis. When the pulse motor 140 is turned forward, the coupling block 138 is lowered in the direction of Z-axis, i.e., is lowered in the direction of depth of cutting, whereby the rotary cutting blade 56 is lowered in the direction of depth of cutting. When the pulse motor 140 is turned reverse, the coupling block 138 is raised in the direction of Z-axis, i.e., is raised in the direction of depth of cutting, whereby the rotary cutting blade 56 is raised in the direction of depth of cutting. Therefore, the pulse motor 140 constitutes a second moving means for moving the cutting means 54 equipped with the rotary cutting blade 56 in the direction of depth of cutting. As will be understood from FIG. 5, a control means 148 constituted by a central processing unit (CPU) controls the operations of the pulse motor 120 that moves the chucking means 38, of the pulse motor 130 that index-moves the cutting means 54, and of the pulse motor 140 that moves the cutting means 54 in the direction of depth of cutting. In the cutting machine constituted according to the present invention, the operation of the pulse motor 140 is controlled, i.e., the up-and-down movement of the cutting means 54 is controlled with precision by the thickness of the workpiece (i.e., total thickness T of the semiconductor wafer 20 and the mounting tape 24 stuck to the back surface thereof) detected by the thickness-detecting means 68.

When the semiconductor wafer 20 is to be cut not up to the total thickness thereof but up to a predetermined depth only, the position of the cutting means 54 in the direction of Z-axis is so set, i.e., the position of the cutting means 54 in the direction of depth of cutting is so set that the lowermost end of the rotary cutting blade 56 is located at a position lowered by a predetermined depth only from the surface of the semiconductor wafer 20. The position of the lowermost end of the rotary cutting blade 56 can be selected with a sufficient degree of precision by, for example, bringing the lowermost end of the rotary cutting blade 56 into contact with the surface of the chucking plate 40 to recognize the original position of the rotary cutting blade 56 in a state where no workpiece is present on the chucking means 38, and calculating the amount the rotary cutting blade 56 has ascended from the original position based on the amount of rotation of the threaded shaft driven by the pulse motor 140.

In the foregoing was described in detail a preferred embodiment of the cutting machine constituted according to the present invention with reference to the accompanying drawings. It should, however, be noted that the invention is in no way limited to the above embodiment only but can be varied or modified in a variety of other ways without departing from the scope of the present invention.

What we claim is:

1. A cutting machine, comprising:
   a chucking means for holding a workpiece that is to be cut;
   a cutting means for cutting the workpiece held on said chucking means;
   a first moving means for moving said chucking means relative to said cutting means in a moving direction perpendicular to a center axis of said chucking means;
   a second moving means for moving said cutting means relative to said chucking means in a direction of depth of cutting which is the direction of said center axis of said chucking means;
   a thickness detecting means for detecting the thickness of the workpiece held on said chucking means; and
   a control means for controlling the motion of said second moving means depending upon the thickness of the workpiece detected by said thickness detecting means and for setting the position of said cutting means in the direction of depth of cutting relative to said chucking means thereby to set the depth of cutting the workpiece by said cutting means;
   wherein said thickness detecting means includes a non-contact back-pressure sensor having a nozzle for flowing out a gas toward the surface of the workpiece held on said chucking means.

2. A cutting machine according to claim 1, wherein said nozzle of said non-contact back-pressure sensor is mounted to freely move in the direction of depth of cutting.

3. A cutting machine according to claim 2, wherein
   said chucking means has an adsorbing surface for vacuum-adsorbing the workpiece; and
   said thickness detecting means includes a nozzle position detecting means for detecting a gap from an original position of the nozzle where an end of said nozzle comes in contact with said adsorbing surface of said chucking means to the present position of said nozzle, and a thickness calculation means for calculating the thickness of the workpiece from the gap between the end of said nozzle and the surface of the workpiece on said chucking means detected by said non-contact back-pressure sensor and from the gap between the original position of said nozzle and the present position of said nozzle detected by said nozzle position detecting means.

4. A cutting machine according to claim 1, wherein said chucking means holds a semiconductor wafer as the workpiece.

* * * * *